US007660937B2

(12) United States Patent
Frantz et al.

(10) Patent No.: US 7,660,937 B2
(45) Date of Patent: Feb. 9, 2010

(54) EMULATING A USB HOST CONTROLLER

(75) Inventors: Christopher Frantz, Houston, TX (US); Theodore F. Emerson, Houston, TX (US); Robert L. Noonan, Houston, TX (US); Luis Luciani, Houston, TX (US); Andrew Brown, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 226 days.

(21) Appl. No.: 11/477,060

(22) Filed: Jun. 28, 2006

(65) Prior Publication Data

US 2008/0005446 A1 Jan. 3, 2008

(51) Int. Cl.
G06F 13/36 (2006.01)
G06F 13/20 (2006.01)
G06F 13/38 (2006.01)

(52) U.S. Cl. ...................... 710/313; 710/311
(58) Field of Classification Search ................ 710/313
See application file for complete search history.

(56) References Cited

U.S. PATENT DOCUMENTS 6,636,929 B1 * 10/2003 Frantz et al. ............... 710/313
2003/0131136 A1 7/2003 Emerson et al.
2003/0220781 A1 11/2003 Salmonsen et al.
2005/0273312 A1 12/2005 Sandulescu et al.
2006/0123129 A1 * 6/2006 Toebes et al. .............. 709/230
2007/0005867 A1 * 1/2007 Diamant ..................... 710/306
2007/0011374 A1 * 1/2007 Kumar et al. .............. 710/105
2007/0043928 A1 * 2/2007 Panesar et al. .............. 711/206
2007/0076748 A1 * 4/2007 Nakagawa ................. 370/463
2008/0140811 A1 * 6/2008 Welch ....................... 709/219

OTHER PUBLICATIONS

Compaq et al.; "Universal Serial Bus Specification"; Apr. 27, 2000; Revision 2.0; p. 4.*
Thompson et al; "PC Hardware in a Nutshell"; O'Reilly; 2nd Edition; Jun. 24, 2002; various pages.*
TransDimension Inc., "TD243 USB Host/Peripheral/OTG Controller Datasheet," Rev. 2.5, Mar. 2004, 78 pp.
Office Action dated Apr. 19, 2007, 23 pp.; Autor et al., "Methods and Systems for Managing a Device," U.S. Appl. No. 11/065,997, filed Feb. 24, 2004.
Final Office Action dated Oct. 4, 2007, 22 pp.; Autor et al., "Methods and Systems for Managing a Device," U.S. Appl. No. 11/065,997, filed Feb. 24, 2004.

* cited by examiner

Primary Examiner—Ryan M Stiglic

(57) ABSTRACT

In at least some embodiments, a method comprises emulating a Universal Serial Bus (USB) host controller at a computer system. The method further comprises using the emulated USB host controller to interface a remote management console with the computer system.

20 Claims, 4 Drawing Sheets

EMULATING A USB HOST CONTROLLER

BACKGROUND

This invention relates in general to the field of electronics and more particularly to emulating a Universal Serial Bus (USB) host controller. The Universal Serial Bus (USB) is a host-centric bus in which the host initiates all of the transactions. USB has enjoyed broad adoption in part because it makes personal computer (PC) peripheral expansion very easy to accomplish.

Virtual devices can be used in remote administration applications in order to manage/monitor a computer system such as a server from a remote location. Some previous implementations of virtual devices have utilized a USB device core included in the management subsystem that had to be connected to the monitored system's USB host controller and controlled by firmware running on the management subsystem. Because it is a single device core, only one device can be emulated at a given time. Also, the virtual device requires real USB device hardware as well as a port on the system's USB host controller to be implemented.

For a background on the operation of a conventional USB host controller, a design guide entitled "Universal Host Controller Interface (UHCI) Design Guide," Revision 1.1., March 1996, by Intel Corporation provides a good background on a UHCI's design and operation and is hereby incorporated by reference. A discussion on USB virtual devices can be found in U.S. Pat. No. 6,636,929, entitled "USB Virtual Devices" by Frantz et al. which is also incorporated by reference as if fully set forth herein.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
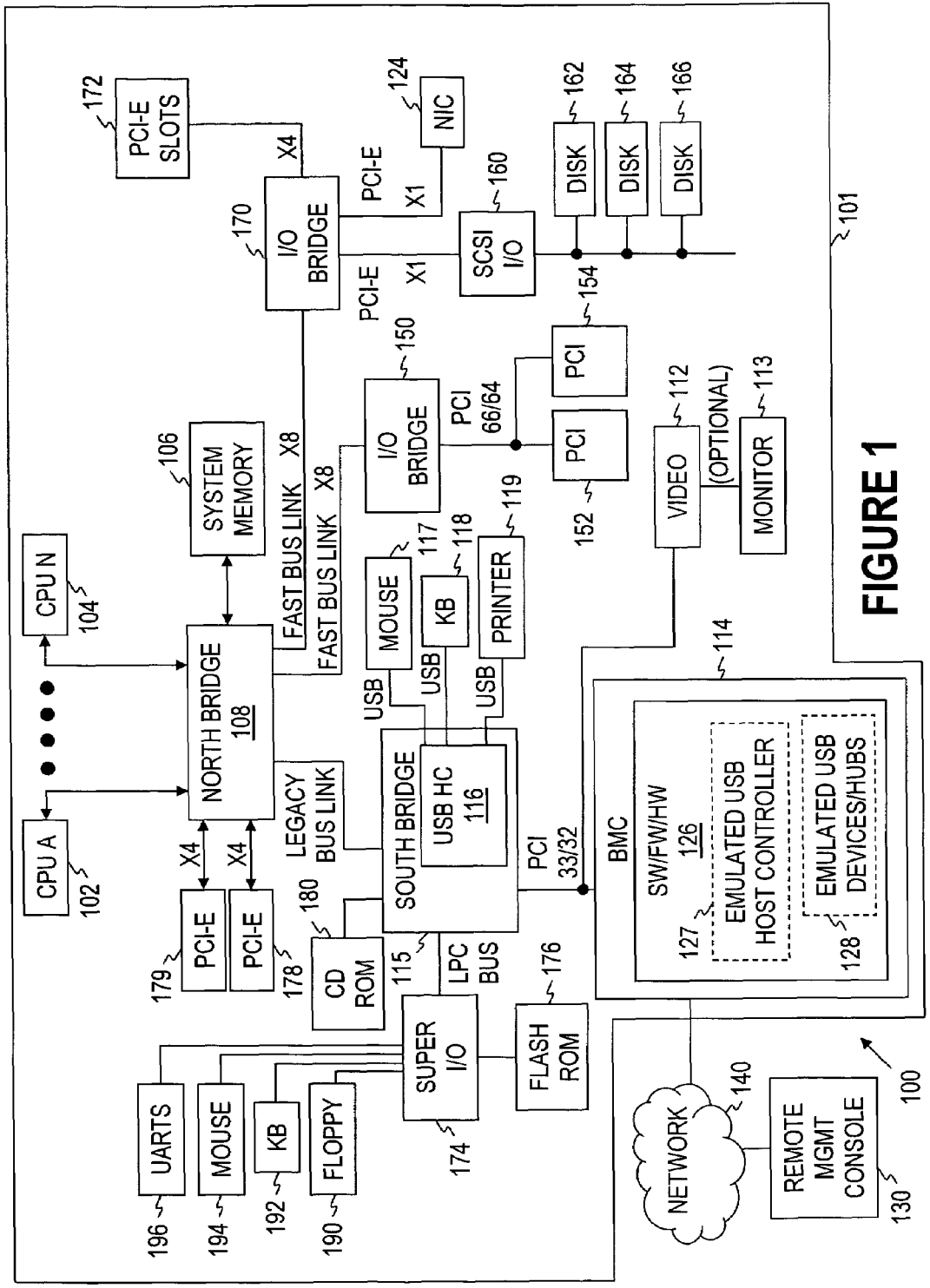
FIG. 1 shows a system in accordance with embodiments of the invention.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention are configured to emulate a Universal Serial Bus (USB) host controller as well as USB peripheral devices and USB hubs. The emulated USB host controller acts as an interface between a remote management console and a host computer system. Thus, when the host computer system receives data from the remote management console, the host computer system recognizes the data as if received from a USB peripheral device via a USB host controller. By emulating USB hubs, simultaneous recognition of a plurality of emulated USB peripheral devices (e.g., a keyboard, a mouse, a floppy drive, a CD-ROM drive, a flash memory device or a printer) by the host computer system is possible. Emulating the different USB peripheral devices enables the host computer system to receive data from the remote management console in different USB-compatible formats (e.g., a keyboard data format, a mouse data format, a floppy drive data format, a CD-ROM drive format, a Flash memory data format, or a printer data format). The USB drivers implemented by the host computer system to interpret data from the emulated USB host controller and the emulated USB peripheral devices are compatible with existing USB protocols (i.e., designing and installing new drivers to recognize data received from the remote management console is unnecessary).

In at least some embodiments, emulation of the USB host controller, the USB hubs, and the USB peripheral devices is provided by a baseboard management controller (BMC) of the host computer system. The BMC also may provide remote management capabilities such as supporting a graphic interface that is used to interface the host computer system with the remote management console. In at least some embodiments, the BMC couples to a communication bus interface of the host computer system other than the serial communication links described in the USB protocol specifications (e.g., the communication bus may be based on a Peripheral Component Interconnect (PCI) protocol or some other protocol). In such embodiments, the data received from the remote management console by the baseboard management controller is converted from one communication protocol (e.g., a USB protocol) to another communication protocol (e.g., a PCI protocol) for use by the host computer system.

In at least some embodiments, the BMC supplies the host operating system (OS) with hot-plug events via Universal Host Controller Interface (UHCI) registers such as port status and control registers "PORTSC1" and "PORTSC2." In a real UHCI controller, the PORTSC1 and PORTSC2 registers represent physical, wired links to USB devices. However, in at least some embodiments presented herein, these registers represent connections to virtual devices (there is no actual wiring or bus connections involved). The BMC firmware can determine which device the host system is trying to communicate with by examining the address in the transfer descriptor (TD) token field and the connect and enable status of the PORTSC registers.

In at least some embodiments, a virtual keyboard is associated with PORTSC1 and a virtual hub is associated with PORTSC2. To notify a host system to recognize the virtual keyboard and virtual hub, a Connect bit (bit0) and possibly a change-in-connect bit (bit1) is asserted for each port. In response to the asserted connect bits, the host system detects the virtual devices and attempts to enumerate (i.e., assign an address) and configure the virtual devices.

Initially (before the virtual devices have been given addresses by the host system's USB driver), both the virtual keyboard and the virtual hub have the address "zero." In this state, communication with the virtual devices based on address alone is problematic because both virtual devices have the same address. To overcome the addressing problem, the host system can choose which device to communicate with by enabling or disabling each PORTSC register (bit2 of the PORTSC registers). Because the BMC firmware can determine the values of the bits in the PORTSC registers, data can be transferred to the appropriate virtual device. Once a virtual device has been enumerated (e.g., given a USB address other than zero), the port for that virtual device can be enabled permanently or temporarily (e.g., until the next reset event) and the BMC firmware can find the virtual device using its associated address.

If desired, additional virtual devices can be added through the virtual hub. Like the PORTSC registers, the virtual hub is simply a representation of more connection points (i.e., wires and busses are not necessary to represent additional USB devices). In at least some embodiments, the virtual hub provides a standardized interface for representing more connected devices. Like the PORTSC registers, virtual devices "attached" to the hub go through the enumeration process, and like the PORTSC registers, the virtual hub ports provide a Connect signal or bit. In this manner, the host OS is able to enumerate and communicate with virtual USB devices that are virtually attached to the virtual hub.

Referring now to the drawings and in particular to FIG. 1, there is shown a system 100 in accordance with embodiments of the inventions. As shown, the system 100 comprises a computer 101 (such as a server) coupled to a remote management console 130 via a network 140. The computer 101 comprises a plurality of central processing units (CPUs) 102, 104 coupled to a bus bridge, commonly referred to in the computer industry as a "North Bridge" 108. The North Bridge 108 couples the CPUs 102, 104 to system memory 106 and to other components of the computer 101. The North Bridge 108 has a significant impact on the computer's performance given that it defines the speed at which data flows between the CPUs 102, 104 and the system memory 106.

As shown, the North Bridge 108 couples to an input/output (I/O) bridge 150 via a "fast" serial bus link (compared to a legacy bus link) having, in some embodiments, eight serial communication channels (×8). This bus may be a proprietary chipset interconnect or may be consistent with an established industry standard such as PCI-Express. In at least some embodiments, the I/O bridge 150 couples to PCI slots 152, 154 via a PCI 66/64 communication interface. The PCI slots 152, 154 may be configured to support insertable/removable PCI cards that enhance the functionality of the computer system 101.

The North Bridge 108 also couples to an I/O bridge 170 via another "fast" bus link (compared to a legacy bus link) having, in some embodiments, eight communication channels (×8). As shown, the I/O bridge 170 couples to a Small Computer System Interface (SCSI) module 160 via a PCI Express (PCI-E) communication bus. The SCSI module 160 supports several storage disks 162, 164, 166 based on a SCSI communication protocol. The I/O bridge 170 also couples to a Network Interface Card (NIC) 124 via a PCI-E communication bus. The NIC 124 enables the computer system 101 to communicate with other computers or network devices based on a network communication protocol such as Ethernet or Transmission Control Protocol/Internet Protocol (TCP/IP). The I/O bridge 170 also couples to PCI-E slots 172 (e.g., via a communication bus having, in some embodiments, four communication channels (×4)). The PCI-E slots are configured to support insertable/removable PCI-E cards that enhance the functionality of the computer system 101. Those skilled in the art will appreciate that the width of the fast bus links as well as PCI-E connections for slots and devices are chosen based on the anticipated bandwidth of the connected devices. Other interconnects as well as other lane widths may be chosen by the system designer.

As shown, the North Bridge 108 also couples to a South Bridge 115 via a legacy communication bus link. This bus link may be a proprietary chipset interconnect or may be consistent with an established industry standard such as PCI-Express. In at least some embodiments, the South Bridge 115 comprises a USB host controller 116 that couples to and supports USB peripheral devices such as a USB mouse 117, a USB keyboard (KB) 118 and a USB printer 119. Those skilled in the art will appreciate that these devices may be coupled through USB connectors (not shown) and may be optional for the proper functioning of the server. The South Bridge 115 also couples to and supports a compact disk read-only memory (CD-ROM) drive 180. The South Bridge 115 also couples to a Super input/output (I/O) interface 174 via a low-pin-count (LPC) bus. The Super I/O (SIO) 174 couples to and supports a Flash ROM 176 as well as a floppy drive 190, a legacy keyboard (KB) 192, a legacy mouse 194 and Universal Asynchronous Receiver/Transmitters (UARTs) 196. Like the USB devices mention above, the SIO 174 provides interfaces to which the enumerated legacy devices may be attached. The presence of a physical legacy keyboard or mouse may not be required for proper server operation.

As shown, the South Bridge 115 also couples to and supports a video card 112 which may optionally (selectively) be coupled to a monitor 113. The South Bridge 115 also couples to and supports a baseboard management controller (BMC) 114. In at least some embodiments, the video card 112 and the BMC 114 couple to the South Bridge 115 via a PCI 33/32 communication bus. Alternatively, the BMC may be coupled to the host via another suitable communication interface such as PCI-Express, PCI-X, 66/64, LPC, or the like. The BMC 114 provides remote management capabilities for the computer system 101. One example of a BMC 114 is referred to as an Integrated Lights-Out (iLO) processor. Examples of remote management capabilities include, but are not limited to console redirection, temperature monitoring, fan control/monitoring, remote power management, and remote media redirection.

In at least some embodiments, the BMC 114 enables a remote management console (e.g., another computer) 130 to communicate with and control functions of the computer system 101 via a network 140. The network 140 may be a local area network (LAN) or a wide area network (WAN). In at least some embodiments, the remote management console 130 communicates with the computer system 101 via a UNIX-based communication protocol such as Telnet. In such embodiments, data that is transferred from the remote management console 130 to the BMC 114 may be converted from one communication protocol (e.g., a network protocol such as TCP/IP) to another communication protocol (e.g., a USB protocol).

As shown, the BMC 114 comprises software/firmware/hardware 126 configured or programmed as an emulated USB host controller 127 (i.e., the software/firmware/hardware 126 pretends to be a USB host controller). In at least some embodiments, the software/firmware/hardware 126 is also configured or programmed as emulated USB peripheral devices and emulated USB hubs 128 (i.e., the firmware/hardware 126 also pretends to be one or more USB peripheral devices and, if necessary, USB hubs). The emulated USB host controller 126 is configured to provide some or all of the functions provided by a USB host controller. Since the emulated host controller 126 needs only to serve as a compatible communication interface with the host, it may exclude logic that is required to communicate with actual USB devices. This advantageously makes the emulated host controller 126 smaller and less complex. There are a plurality of USB-compatible host controllers that could be emulated by the BMC 114. In the embodiments described herein, the emulated USB host controller 127 is based on a Universal Host Controller Interface (UHCI) specification. Alternatively, the emulated USB host controller 127 could be based on an Open Host Controller Interface (OHCI) specification or an Enhanced Host Controller Interface (EHCI) specification.

The emulated USB host controller 127 and the emulated USB peripheral devices/hubs 128 of the BMC 114 enable data received from the remote management console 130 to be recognized by the computer system 101 (the host computer system) based on existing USB drivers. As shown, the South Bridge 115 of the computer system 101 already comprises a USB host controller 116 that supports USB peripheral devices 117, 118, 119. Thus, the USB drivers that support the USB host controller 116 and the USB peripheral devices 117, 118, 119 (e.g., the USB drivers enable the USB host controller 116 and the USB peripheral devices 117, 118, 119 to communicate with other components of the computer system 101) can also support the emulated USB host controller 127 and the emulated USB peripheral devices/hubs 128. In this manner, data from the remote management console 130 is recognized by the computer system 101.

As an example, the remote management console 130 may be monitoring the operation and performance of the computer 101. If the computer 101 is a "headless" device (e.g., a server), the remote management console 130 can display information regarding the condition of the computer 101 on a real-time basis. Using the emulation capabilities of the BMC 114, the remote management console 130 and peripheral devices of the remote management console (e.g., a floppy drive, a CD-ROM drive) can, for example, allow the computer 101 to reboot from a remotely mounted device if an emergency or maintenance condition occurs requiring a reboot. If such a condition occurs, the computer 101 is able to recognize an emulated floppy drive or emulated CD/ROM drive provided the BMC 114 and use one of the emulated drives as the boot-up device (even if a real floppy drive or CD/ROM drive of the computer 101 is unavailable).

Thus, the remote management console 130 or a user of a remote management console 130 is able to control the boot-up process of the computer 101 from a remote location (e.g., via an Internet or other network connection). In at least some embodiments, an administrator at the remote management console 130 can communicate with the BMC 114 via a network connection (e.g., via a web page interface) and select a "virtual device" from a menu in order to emulate the floppy drive, the CD-ROM drive or other USB peripheral devices at the managed computer 101. If a user selects to emulate multiple USB peripheral devices, the BMC 114 is able to emulate one or more USB hubs such that the host computer system 101 is able to simultaneously recognize the plurality of emulated USB peripheral devices. Using software, the BMC 114 is able to emulate as many USB hubs and USB peripheral devices as desired. Thereafter, the administrator at the remote management console 130 is able to control the boot-up process, memory access or other remote management tasks via the BMC 114.

If the data from the remote management console 130 is transmitted using a communication protocol that is not USB-compliant (e.g., a Network protocol), the BMC 114 is also configured to convert data from the non-compliant protocol to a USB-compliant protocol. In one embodiment, the BMC 114 examines transfer descriptors and other linked list data structures created by the host in system memory consistent with the USB host controller interface specification. Through these data structures, the BMC 114 may discern operations requested by the host CPU. For example, if the emulated device is a USB mass storage device, the BMC may discern a block read or block write command to the USB media. This discerned operation may be relayed to the remote management console 130 through the network 140. Software running on the remote management console 130 may receive the command and deliver a response through communication packets on the network 140. The BMC 114 may receive the response, and fill in the data structures accordingly. For example, if the discerned operation was a block read, the BMC 114 may begin transferring the requested block data to the host through a means consistent with the desired USB host controller interface specification. The format of the packets used to communicate between the BMC 114 and remote management console 130 may be chosen based on the system designer's requirements. Preferably, a guaranteed delivery protocol is chosen, such as Transmission Control Protocol (TCP).

As described above, software/firmware/hardware 126 of the BMC 114 provides an emulated USB host controller 127. In at least some embodiments, a combination of hardware and software is implemented to emulate the different functions of a USB host controller. For example, one function of a USB host controller relates to performing "list walking." In order to communicate with the USB host controller, the host builds a linked list in host memory 106. Elements in the linked list contain a pointer to the next element as well as command/status/data. As used herein, list walking means reading the next element from host memory, and determining whether it needs processing (some elements are queue heads which just contain pointers to other elements, and some are transfer descriptors that are inactive). If it does not need processing the next element is loaded (based on the pointer). This continues until an active transfer descriptor is found that needs to be handled. In at least some embodiments, hardware components of the BMC 114 implement all list walking states of a USB host controller up to and including the "Fetch TD" state of the USB host controller and software emulates all list walking states after the Fetch TD state of a USB host controller. Alternatively, other combinations of hardware and software may be used to implement the list walking states of the emulated USB host controller 127.

In embodiments which use a software-only solution for list walking, the BMC processor's ability to perform other duties for the BMC 114 decreases (i.e., the processor is being used to execute software). In embodiments which use a hardware-only solution for list walking, such as a real USB host controller, flexibility is limited. In some embodiments, both hardware and software are implemented for list walking to reduce the above-mentioned disadvantages. For example, if the "Fetch TD" state is selected as the transition point between hardware and software, the BMC's processor could be off-loaded from performing the "mindless" searching of the list and other hardware could perform the searching. Once a TD is found that requires flexibility, software could be executed by the BMC's processor to provide the desired flexibility.

Figure 2:
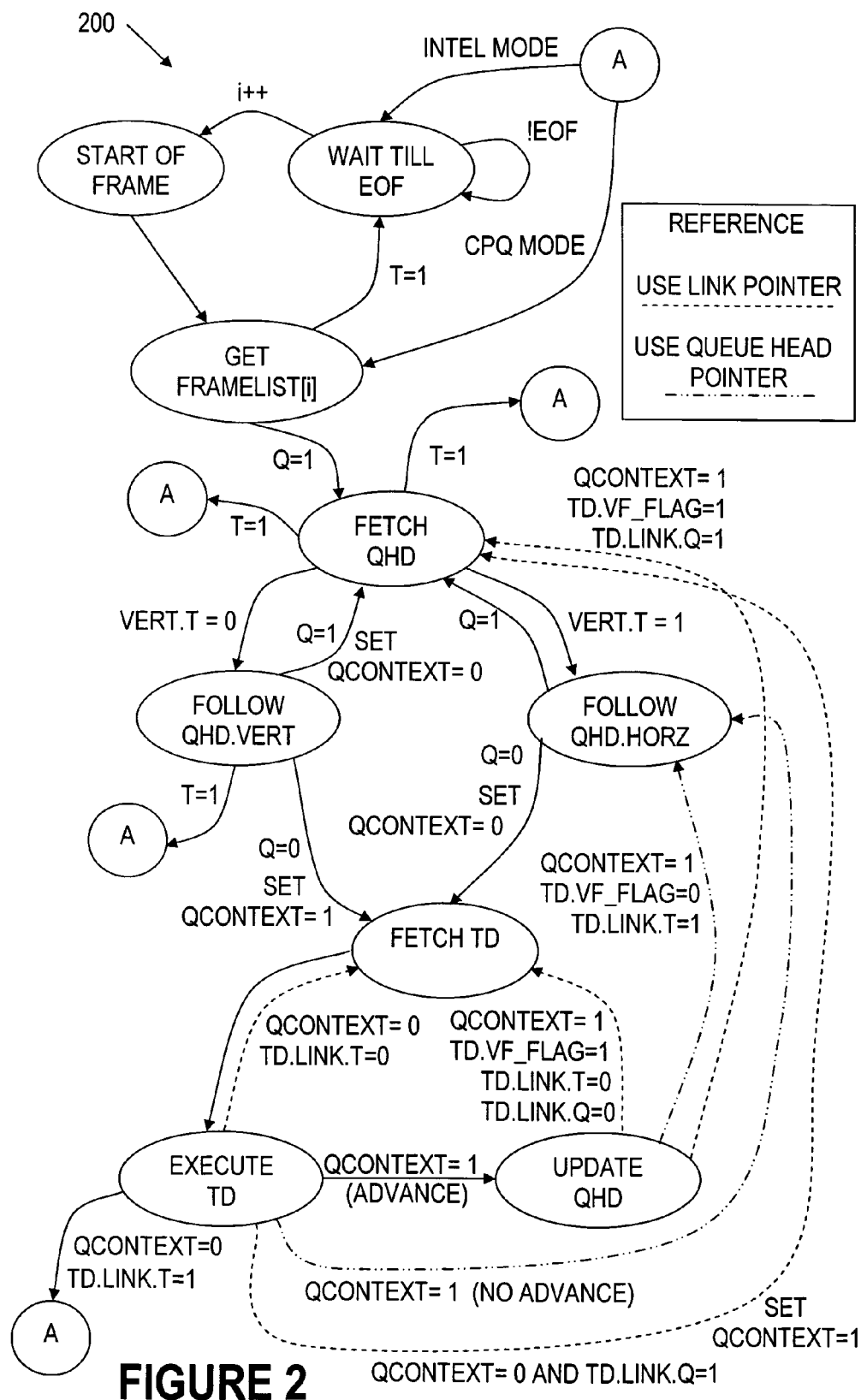
FIG. 2 shows a state diagram of a Universal Serial Bus (USB) linked-list in accordance with embodiments of the invention.

FIG. 2 shows a state diagram 200 that is performed by the emulated USB host controller 127 in accordance with embodiments of the invention. The state diagram 200 contains transitions for standalone transfer descriptors (TDs) as well as queued TDs. TDs are descriptors that provide information on the characteristics of a transaction requested on the USB by a client. The state diagram 200 allows for TDs and QHs to be referenced from any link pointer which may be encountered by the emulated USB host controller 127. Most of the states referenced in the state diagram 200 in FIG. 2 follow a USB schedule list traversal decision table as discussed in the reference UHCI design guide (see table 9 in the design guide). As previously mentioned the emulated USB host controller 127 could alternatively follow OHCI or EHCI design guides.

In some embodiments, the entire state diagram 200 (i.e., the list walking function of a USB host controller based on UHCI) is emulated using software that is stored and executed by the BMC 114. In alternative embodiments, a combination of hardware and software emulates the state diagram 200. For example, all the states up to the "Execute TD" state may be performed with the assistance of hardware components of the BMC 114, while the rest of the states may be performed using software that is stored and executed by the BMC 114.

Figure 3:
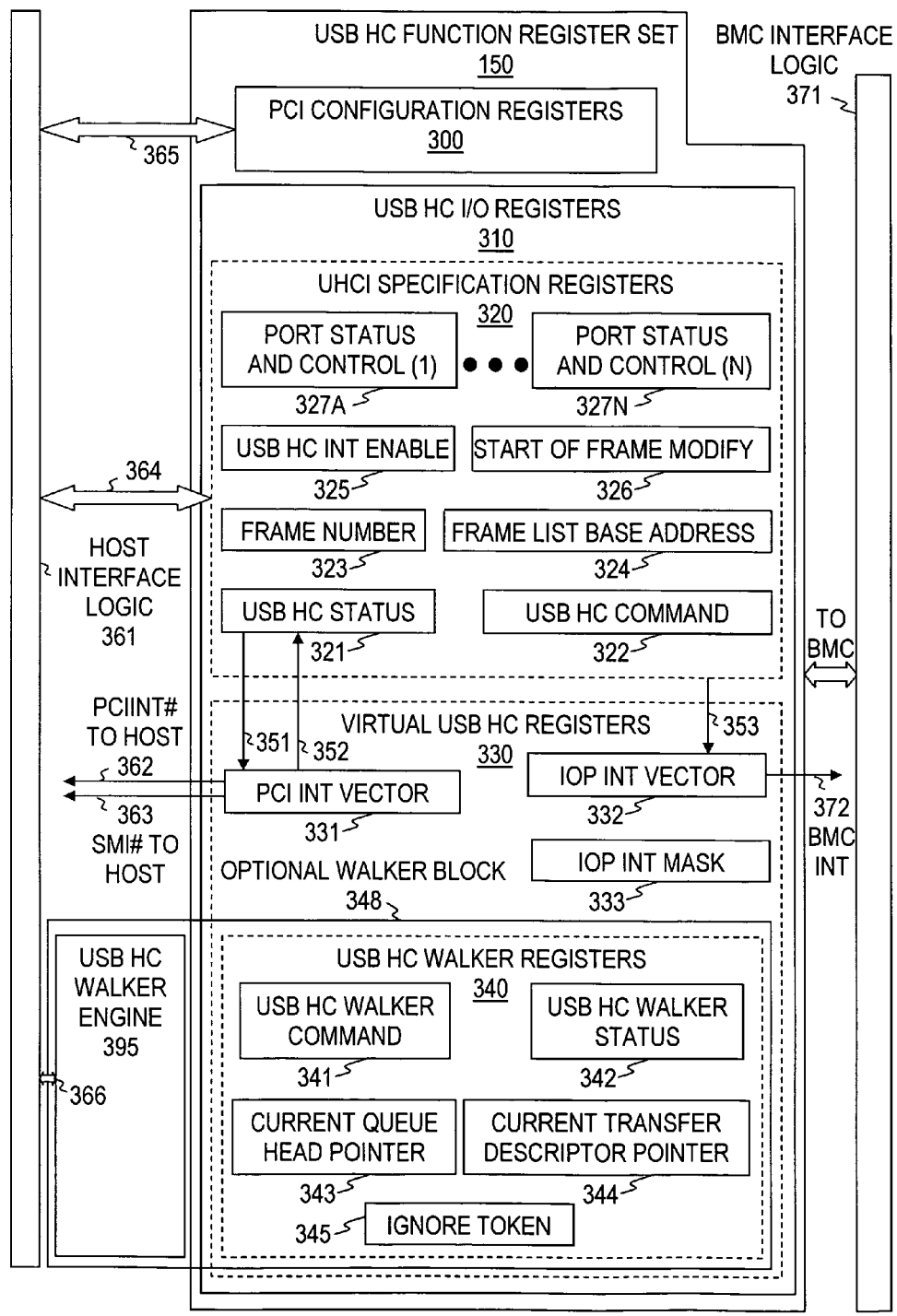
FIG. 3 shows a set of USB host-controller registers in accordance with embodiments of the invention.

FIG. 3 shows a USB host controller register set 150 in accordance with embodiments of the invention. In FIG. 3, the USB host controller register set 150 is described as a component of the BMC 114 of FIG. 1 although other embodiments are possible. As shown in FIG. 3, the USB host controller register set 150 couples to host interface logic 361. The host interface logic 361 interfaces the USB host controller register set 150 with a host computer system (e.g., the computer system 101 of FIG. 1). In some embodiments, the host interface logic 361 is compatible with a PCI interface. This is due to the design of the BMC 114, which (in FIG. 1) is configured to reside on a peripheral communication bus (PCI 33/32). Alternatively, the host interface logic 361 could be compatible with other communication busses such as PCI Express (PCI-E) in accordance with other BMC embodiments (i.e., BMC embodiments could be configured to reside on any existing or future communication bus).

In at least some embodiments, the host computer system has limited access to the USB host controller register set 150 as indicated by the "bus" arrows 364, 365 connecting the host interface logic 361 only to the PCI Configuration registers 300 and the UHCI specification registers 320. The host computer system also can be accessed by a USB host controller walker engine 395 through a "bus" connection 366. The USB host controller walker engine 395 accesses host memory (e.g., the system memory 106 of FIG. 1) through the host interface logic 361.

The USB host controller register set 150 also couples to BMC interface logic 371. The BMC interface logic 371 interfaces the USB host controller register set 150 with other components of the BMC 114 such as firmware/hardware components (e.g., the software/firmware/hardware 126) that are being used to emulate USB peripheral devices and USB hubs. As shown, the BMC interface logic 371 has access to all of the USB host controller register set 150 as indicated by the "bus" arrow connecting to the full USB host controller register set block 150.

The USB host controller register set 150 comprises PCI configuration registers 300 and USB host controller I/O registers 310. The PCI configuration registers 300 are common to any PCI function. In at least some embodiments, the PCI configuration registers 300 are configured to identify the USB host controller register set 150 as a USB host controller. In this manner, the operating system of a host computer system (e.g., the computer system 101) recognizes the USB host controller register set 150 as an actual USB host controller (even though some or all of the USB host controller functions provided by the USB host controller register set 150 are emulated).

The USB host controller I/O registers 310 comprise all of the registers that are specific to embodiments of the invention. As shown, the USB host controller I/O registers 310 comprise UHCI specification registers 320 and virtual (emulated) USB host controller registers 330. The UHCI specification registers 320 are simply the registers that are required by the UHCI specification. In alternative embodiments, the UHCI specification registers 320 could be replaced by OHCI or EHCI specification registers. As shown, the port status and control registers 327A-327N can be replicated to provide as many ports as needed. In at least some embodiments, the port status and control registers 327A-327N comprise 8 ports.

The virtual USB host controller registers 330 provide an emulated USB host controller (e.g., the emulated USB host controller 127 of FIG. 1). In some embodiments, the virtual USB host controller registers 330 are associated with firmware/hardware (e.g., the software/firmware/hardware 126) of the BMC 114 that emulates a USB host controller. As shown, the virtual USB host controller registers 330 comprise a PCI interrupt (INT) vector register 331, an input/output processor (IOP) INT vector register 332, and an IOP INT mask register 333 that will later be described. The virtual USB host controller registers 330 also comprise an optional walker block 348 having USB host controller walker registers 340 that are used to control and receive status from USB host controller walker engine 395 that interfaces with the host computer system via the host interface logic 361.

Based on the USB host controller walker registers 340, the USB host controller walker engine 395 examines linked lists in host memory. In at least some embodiments, the USB host controller walker engine 395 is linked to the UHCI specification registers 320. In this manner, the USB host controller walker engine 395 is able to determine the frame number (by accessing bits in the frame number register 323) that the USB host controller walker engine 395 is currently processing (e.g., the current frame number is shown as the value "i" in the state diagram 200 shown in FIG. 2). Also, the USB host controller walker engine 395 is able to determine the frame address (by accessing bits in the frame list base address register 324) and whether or not to "walk" in the first place (by accessing a run/stop bit in the USB command host controller command register 322).

In at least some embodiments, the USB host controller walker registers 340 provide a way for software/firmware of the BMC 114 to control and monitor the USB host controller walker engine 395. For example, the USB host controller walker command register 341 contains initialize (init), run, and interrupt clear bits. The init, run, and interrupt clear bits enable the USB host controller walker engine 395 to start, to stop and to re-initialization as needed. The USB host controller walker status register 342 contains a number of error bits for use by BMC firmware in the event of an error on the host. The error bits enable the USB host controller walker status register 342 to track error conditions. For example, in some embodiments, a standard set of PCI error conditions may be tracked (e.g., a "Grant Timeout" condition, a "target ready" (TRDY) timeout condition, and a "Livelock" condition).

The USB host controller walker status register 342 also contains the following five bits for conveying status of the USB linked list: TD active, USB host controller walker (UHCW) 1 ms frame timeout, UHCW queue context, IOC frame, and UHCW 2 ms frame timeout. These status bits enable the USB host controller walker status register 342 to convey status and error conditions encountered by the USB host controller walker engine 395 to the BMC 114. Specifically, the TD active bit indicates whether an active transfer descriptor (TD) has been encountered. The UHCW 1 ms frame timeout bit indicates whether a one millisecond (ms) frame timer has expired. The UHCW queue context bit indicates the state of a "Qcontext" bit (see the state diagram in FIG. 2). The IOC frame bit indicates whether or not the host expects an interrupt from the current TD upon completion of handling the TD. The UHCW 2 ms frame timeout bit indicates whether a two millisecond (ms) frame timer has expired.

As shown, the USB host controller walker registers 340 also comprise a current queue head (QH) pointer 343 and a current transfer descriptor pointer 344. The current QH pointer 343 and the current TD pointer 344 inform BMC firmware where in the host memory (e.g., the system memory 106) the USB host controller walker engine 395 was at when it had to stop and interrupt the BMC 114. In at least some embodiments, the current QH pointer 343 and the current TD pointer 344 reflect where the walker was at when it entered the "execute TD" state on the state diagram 200 shown in FIG. 2.

The USB host controller walker registers 340 also comprise a token ignore register 345. The token ignore register 345 instructs the USB host controller walker engine 395 to ignore (i.e., do not execute) a TD which has a particular token pattern in the token field. In this manner, the token ignore register 345 is able to reduce the number of interrupts for "bogus" TDs which sometimes occur due to software bugs. Reducing the number of interrupts for bogus TDs improves the efficiency of BMC 114.

In some embodiments, the emulated USB host controller of the BMC 114 keeps a list of the bogus TDs. Thereafter, the host computer system can use the list of bogus TDs to correct bug conditions of a USB host controller. The bogus TDs are a set of transfer descriptors set up for a host operating system to avoid certain hardware defects of some UHCI controllers. While the BMC firmware can be configured to ignore the bogus TDs, some UHCI controllers use the "bogus TDs" to prevent entering into an adverse hardware state.

As previously mentioned the virtual (emulated) USB host controller registers 330 comprise the PCI INT vector register 331, the IOP INT vector register 332, and the IOP INT mask register 333. In operation, the IOP INT vector register 332 contains a bit for each register contained in UHCI specification registers 320. If a host computer system writes to any of the UHCI specification registers 320, then a corresponding bit will be set in the IOP INT vector register 332 (indicated by the arrow 353 from block 320 to 332). As long as the corresponding bit is not "masked" (nullified) in the IOP interrupt mask register 333, setting the corresponding bit will generate an interrupt 372 to the BMC 114. The BMC interrupt 372 allows software/firmware of the BMC 114 to be notified when the host computer system has interacted with the emulated USB host controller of the BMC 114.

Firmware of the BMC 114 can read the IOP INT vector register 332 to determine which registers have been changed. Firmware of the BMC 114 can then read the related UHCI specification registers and take the appropriate action. For example, if the host operating system changes some of the bits in the USB Command register 322 (e.g., clearing the Run/Stop bit), the BMC firmware receives an interrupt and examines the contents of the USB Command register 322 to determine that the Run/Stop bit has been cleared. In response to this change, the BMC firmware stops the UHCI subsystem as would clearing the Run/Stop bit signal in a real USB host controller. As another example, when the host system updates the frame list base address register 324, the BMC 114 receives an interrupt when this register is written. Thereafter, the BMC firmware reads the IOP interrupt vector register 332 to determine which register was updated and then reads the frame list base address register 324 to determine the new address. The walker engine 395 can then be stopped and restarted to begin walking the list at the new location (identified by the new address).

The PCI INT vector register 331 is used by firmware of the BMC 114 to interrupt the host computer system and to indicate status. For example, in some embodiments, setting a certain bit in the PCI INT register 331 will generate a host interrupt (e.g., the interrupt may be a PCIINT# host interrupt 362 or a SMI# host interrupt 363) unless the bit is "masked" (nullified) via the USB host controller INT enable register 325. If the host interrupt is generated, the PCI INT vector register 331 sets a corresponding status bit in the USB host controller status register 321 (indicated by the register set signal 352). When processing the host interrupt, the host computer system reads the USB host controller status register 321 to determine the status and take the appropriate action. For example, once firmware of the BMC 114 has completed any processing needed to perform a TD that sets the Interrupt on Completion (IOC) bit, an appropriate bit in the PCI interrupt vector register 331 will also be set. Setting the appropriate bit in the PCI interrupt vector register 331 causes the USB interrupt bit (bit 0) of the USB HC status register 321 to be set. Host software handles the interrupt by reading the USB HC status register 321. For example, finding bit 0 set will indicate that the TD is complete and host software can free up the memory/resources associated with that TD and add or remove items from the list as necessary. After processing the host interrupt, the host computer system clears the status bit in the USB host controller status register 321 as well as a corresponding bit in the PCI INT register 331 (indicated by the register clear signal 351).

Figure 4:
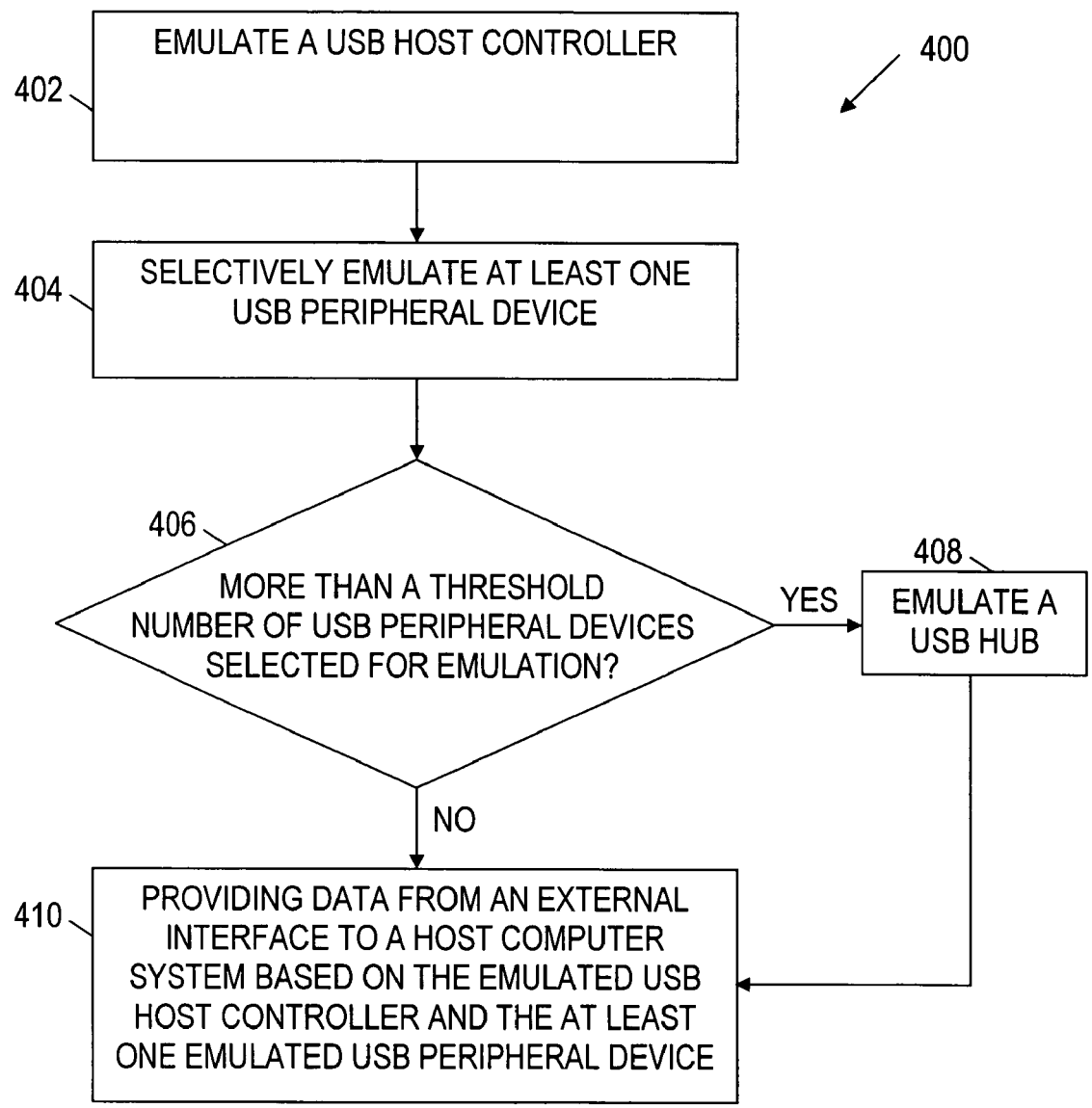
FIG. 4 shows a method in accordance with embodiments of the invention.

FIG. 4 shows a method 400 in accordance with embodiments of the invention. As shown in FIG. 4, the method 400 comprises emulating a USB host controller (e.g., the emulated USB host controller 127) at block 402. In at least some embodiments, emulating the USB host controller is based on the UHCI specification. In alternative embodiments, emulating the USB host controller is based on the OHCI or EHCI specifications. Also, emulating the USB host controller may be based on software/firmware/hardware of a BMC 114 that provides remote management capabilities to a host computer system (i.e., the host computer system is able to be remotely managed by a remote management console via the BMC 114).

The method 400 further comprises selectively emulating at least one USB peripheral device (block 404). For example, selectively emulating at least one USB peripheral device may involve emulating one or more of a mouse, a keyboard, a floppy disk drive, a CD-ROM drive, a Flash memory, and a printer based on input from a user. For example, the user may select which USB peripheral devices to emulate via a web page interface provided by the BMC 114. If more than a threshold number of USB peripheral devices are selected to be emulated (determination block 406), the method 400 comprises emulating a USB hub (block 408). After emulating the USB hub (block 408) or if more than a threshold number of USB peripheral devices are not selected to be emulated (determination block 406), the method 400 comprises providing data from an external interface to a host computer system based on the emulated USB host controller and at least one emulated USB peripheral device (block 410).

The method 400 enables a host computer system having a BMC 114 to recognize data from a remote management console based on existing USB drivers. By emulating a USB host controller, USB peripheral devices and, if necessary, USB hubs, the BMC allows different types of data from a remote management console to be recognized by the host computer system. For example, data from a mouse, a keyboard, a floppy drive, a CD-ROM drive a Flash memory device or a printer at the remote management console location could be recognized by the host computer system as if the mouse, the keyboard, the floppy drive, the CD-ROM drive, the Flash memory device or the printer at the remote management console location were USB peripheral devices coupled locally to the host computer system via a USB communication bus. Thus, embodiments of the invention enable improved remote administration of a computer system such as the computer 101.

The above discussion is meant to be illustrative of the principles and various embodiments of the present invention. Numerous variations and modifications will become apparent to those skilled in the art. It is intended that the following claims be interpreted to embrace all such variations and modifications.

What is claimed is:

1. A method, comprising:
   emulating a Universal Serial Bus (USB) host controller at a computer system;
   selectively emulating a USB hub, the emulated USB hub supports a plurality of emulated USB peripheral devices;
   emulating at least one USB peripheral device based on user input;
   determining if more than a threshold number of USB peripheral devices are to be emulated;
   if more than the threshold number of USB peripheral devices are to be emulated, emulating the USB hub; and
   using the emulated USB host controller to interface a remote management console with the computer system.

2. The method of claim 1 wherein said emulating a USB host controller is based on a USB host controller specification selected from a group consisting of a Universal Host Controller Interface (UHCI) specification, an Open Host Controller Interface (OHCI) specification, and an Enhanced Host Controller Interface (EHCI) specification.

3. The method of claim 1 wherein emulating at least one USB peripheral device based on user input comprises selecting to emulate at least one USB peripheral device via a web page interface.

4. The method of claim 1 further comprising using the emulated USB host controller, the emulated USB peripheral devices and the emulated USB hub to interface the remote management console with the computer system.

5. The method of claim 1 wherein the emulated USB host controller is provided by a baseboard management controller (BMC) that supports remote management of the computer system.

6. The method of claim 1 wherein said emulating a USB host controller further comprises selectively instructing a USB host controller walker engine to ignore a predetermined pattern of a transfer descriptor token field.

7. A computer system, comprising:
   at least one central processing unit (CPU);
   a system memory coupled to the at least one CPU; and
   a baseboard management controller coupled to the at least one CPU and the system memory, the baseboard management controller (BMC) provides an emulated Universal Serial Bus (USB) host controller to interface the computer system with a remote management console,
   wherein a first set of list walking states for the emulated USB host controller are implemented by hardware components of the BMC and wherein a second set of list walking states for the emulated USB host controller are implemented by software executed by the BMC.

8. The computer system of claim 7 wherein the BMC provides at least one emulated USB peripheral device in addition to the emulated USB host controller to interface the computer system with a remote management console.

9. The computer system of claim 8 wherein the at least one emulated USB peripheral device corresponds to at least one peripheral device used by the remote management console.

10. The computer system of claim 8 wherein, if the BMC provides more than a threshold number of emulated USB peripheral device, the BMC is configured to emulate a USB hub.

11. The computer system of claim 8 wherein the at least one emulated USB peripheral device is selected by a user.

12. The computer system of claim 7 wherein the emulated USB host controller is based on a USB host controller specification selected from the group consisting of a Universal Host Controller Interface (UHCI) specification, an Open Host Controller Interface (OHCI) specification, and an Enhanced Host Controller Interface (EHCI) specification.

13. The computer system of claim 12 wherein the emulated USB host controller comprises UHCI registers and virtual USB host controller registers, the virtual USB host controller registers being configured to generate interrupts to at least one CPU and to the BMC.

14. The computer system of claim 13 wherein the interrupts to at least one CPU are based on a protocol selected from a group consisting of a Peripheral Component Interconnection (PCI) protocol and a System Management Interrupt (SMI) protocol.

15. The computer system of claim 12 wherein the emulated USB host controller further comprises USB host controller walker registers that enable performance of USB list walking states.

16. The computer system of claim 12 wherein the emulated USB host controller further comprises a USB walker engine that performs a selectable amount of UHCI list walking states based on hardware and performs a selectable amount of UHCI list walking states based on software.

17. The computer system of claim 12 wherein the emulated USB host controller further comprises a token ignore register that stores a token pattern of a transfer descriptor (TD) token field to be ignored by a USB walker engine.

18. A computer system, comprising:
   means for emulating a Universal Serial Bus (USB) host controller; and
   means for interfacing the computer system to a remote management console based on emulating the USB host controller,
   wherein said means for emulating a USB host controller comprises,
      means for tracking when a host system writes to a register, means for selectively interrupting a baseboard management controller (BMC) when the host system writes to the register, means for selectively interrupting the host system by the BMC when a task performed by the emulated USB host controller is complete.

19. The computer system of claim 18 further comprising:
means for selectively emulating at least one USB peripheral device; and means for interfacing the computer system to the remote management console based on emulating the USB host controller and the at least one USB peripheral device.

20. The computer system of claim 19 further comprising means for emulating a USB hub if more than a threshold number of USB peripheral devices are to be emulated.

* * * * *